United States Patent
Feist (10) Patent No.: US 10,748,582 B1
(45) Date of Patent: Aug. 18, 2020

(54) DATA STORAGE DEVICE WITH RECORDING SURFACE RESOLUTION

(71) Applicant: Seagate Technology LLC, Cupertino, CA (US)

(72) Inventor: Jason Matthew Feist, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/450,260

(22) Filed: Jun. 24, 2019

(51) Int. Cl.
*G11B 20/12* (2006.01)
*G11B 27/36* (2006.01)
*G06F 1/18* (2006.01)
*G11B 5/82* (2006.01)

(52) U.S. Cl.
CPC .............. *G11B 27/36* (2013.01); *G06F 1/187* (2013.01); *G11B 5/82* (2013.01)

(58) Field of Classification Search
CPC ..... G11B 5/588; G11B 5/00813; G11B 5/584; G11B 5/5921; G11B 5/5922; G11B 15/1841; G11B 15/473; G11B 20/1833
USPC ................................. 360/53, 48, 75
See application file for complete search history.

(56) References Cited

U.S. PATENT DOCUMENTS

| | | | |
|---|---|---|---|
| 6,560,052 B2 | 5/2003 | Ng et al. | |
| 6,751,036 B2 | 6/2004 | Quak et al. | |
| 6,954,326 B2 * | 10/2005 | Bement | G11B 19/04 360/69 |
| 6,957,379 B1 | 10/2005 | Patapoutian et al. | |
| 7,012,771 B1 | 3/2006 | Asgari et al. | |
| 7,283,316 B2 * | 10/2007 | Chiao | G11B 5/012 360/31 |
| 7,656,598 B2 | 2/2010 | Iida | |
| 9,047,921 B2 | 6/2015 | Jen et al. | |
| 9,070,390 B2 * | 6/2015 | Green | G11B 5/455 |
| 9,230,605 B1 * | 1/2016 | Moser | G11B 27/36 |
| 9,355,680 B1 | 5/2016 | Jin et al. | |
| 9,548,070 B1 | 1/2017 | Chatradhi et al. | |
| 9,672,851 B1 * | 6/2017 | Gao | G11B 5/012 |
| 9,741,391 B1 * | 8/2017 | Jin | G11B 20/1217 |
| 9,959,892 B1 * | 5/2018 | Miyamura | G11B 20/1201 |
| 10,073,774 B2 | 9/2018 | Jibbe et al. | |
| 10,223,275 B2 * | 3/2019 | Feist | G06F 12/0871 |
| 2017/0097877 A1 | 4/2017 | Dhanda et al. | |
| 2017/0344425 A1 | 11/2017 | Akiyama et al. | |

* cited by examiner

*Primary Examiner* — Nabil Z Hindi (74) *Attorney, Agent, or Firm* — Hall Estill Attorneys at Law (57) ABSTRACT

A data storage device can employ recording surface-level resolution with as part of a computing system where the data storage device has a first recording surface configured with an initial areal density. By monitoring data storage operation of the data storage device with a connected resolution module, a resolution strategy can be generated with the resolution module based on the monitored data storage operation. The initial areal density may then be changed to an altered areal density prescribed by the resolution strategy.

20 Claims, 4 Drawing Sheets

DATA STORAGE DEVICE WITH RECORDING SURFACE RESOLUTION

SUMMARY

A data storage device, in accordance with various embodiments, has a first recording surface and is connected to a resolution module. The first recording surface has an altered areal density in response to a resolution strategy generated by the resolution module with the altered areal density being different than an initial areal density of the first recording surface present when the data storage device was manufactured.

In other embodiments, a data storage device is installed in a computing system where the data storage device has a first recording surface configured with an initial areal density. The monitoring of data storage operation of the data storage device with a connected resolution module allows a resolution strategy to be generated with the resolution module based on the monitored data storage operation. The initial areal density is then changed to an altered areal density prescribed by the resolution strategy.

Operation of the data storage device, in some embodiments, involves installing a data storage device into a computing system with the data storage device having a first recording surface configured with an initial areal density. Data storage operation of the data storage device is monitored with a connected resolution module and is provided to a user via a user interface. A resolution strategy is generated with the resolution module based on the monitored data storage operation. After receiving instructions from a user to change a data storage configuration of the first recording surface, the initial areal density of the first recording surface is changed to an altered areal density in response to the user's instructions and as prescribed by the resolution strategy.

DETAILED DESCRIPTION

This disclosure generally relates to embodiments of a data storage system that intelligently utilizes recording surface resolution to optimize data storage performance, flexibility, and cost.

As stationary and mobile computing devices become more sophisticated and prolific in society, the amount of data being created, transferred, stored, and retrieved is growing rapidly. To meet the public and industry demand for greater data capacity, more reliable data transfers, and heightened data access speeds, large numbers of data storage devices are employed. While a data storage system with numerous data storage devices can provide robust data storage, errors, failures, and alterations to the data storage system, over time, can severely degrade data storage performance, reliability, and security.

It is contemplated that the susceptibility of data storage systems, particularly large-scale systems with numerous data storage devices being collectively employed, is tied to the level of areal density resolution. For instance, data storage systems with device-level areal density resolution can be plagued with reduced capacity, data access speed, and reliability as the entirety of the device is treated in accordance with the problematic regions of memory that likely occupy a small portion of the entire device. In contrast, data storage systems with smaller areal density resolution, such as platter-level or recording surface-level resolution, can isolate, alter, and otherwise adapt individual aspects of a data storage device to compensate for encountered errors and failures without disregarding portions of the data storage device that are properly functioning.

It is noted that the term "areal density resolution" is meant as the smallest volume of data capacity that is capable of being formatted to provide an areal density and a corresponding data capacity. Areal density resolution is further contemplated with a correlation to physical data locations, such as a single recording surface of a platter, a single platter, or an entire data storage device comprising multiple platters and recording surfaces. For example, device-level areal density resolution maintains a matching areal density configuration for each constituent platter and recording surface of the device while recording surface-level resolution maintains an areal density configuration only for a single recording surface, which allows for different recording surfaces of a single data storage device to employ different areal density configurations that can optimize short-term and long-term data storage performance.

Accordingly, various embodiments are directed to data storage systems utilizing less than device-level areal density resolution to optimize data storage performance. The ability to adjust the areal density configuration for less than all the physical data addresses in a data storage device allows errors and failures to be proactively, and reactively, compensated without altering the areal density of other, potentially error-free, portions of a data storage device. Smaller than device-level areal density resolution further allows a data storage system to engage in sophisticated data tiering schemes within a single data storage device, which can maximize the performance and flexibility of the system over time.

It is noted that the assorted embodiments provides functionality that enables software ecosystem development for multi-tenancy and secure banding where many applications have unique performance and density requirements. Embodiments may further allow the software to optimize the cost structure and performance structure of a data storage device, such as a disk drive, so that it can host many containers/applications/users on the same device concurrently. As a result, a data storage system can be a key enabler for colocation facilities, edge facilities, and software defined ecosystems moving forward to achieve cost scale.

Figure 1:
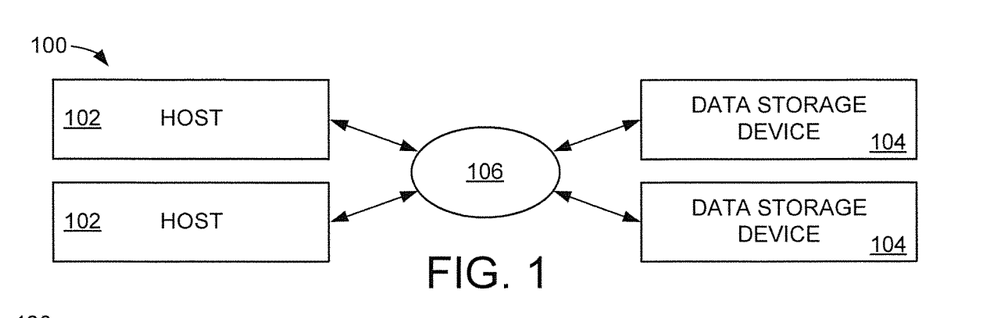
FIG. 1 is a block representation of an example data storage system configured and operated in accordance with some embodiments.

FIG. 1 depicts a block representation of an example data storage system 100 in which a number of remote hosts 102 have access to a data capacity provided by a plurality of separate data storage devices 104 via one or more network 106 connections. The data storage system 100 may be physically located in one or more physical locations. For instance, a first host 102 may be physically located in a separate country, time zone, or continent than the data storage device(s) 104 being accessed to store, or retrieve, data thanks to the wired and/or wireless interconnections of the network 106.

While the respective data storage devices 104 of the data storage system 100 can be physically located in different global regions, various embodiments congregate numerous data storage devices 104 in a single physical location, which can be characterized as a data center. Such data storage device 104 arrangement can provide efficient physical and logical management over time along with power and cooling capabilities that enjoy the economy of scale.

Figure 2:
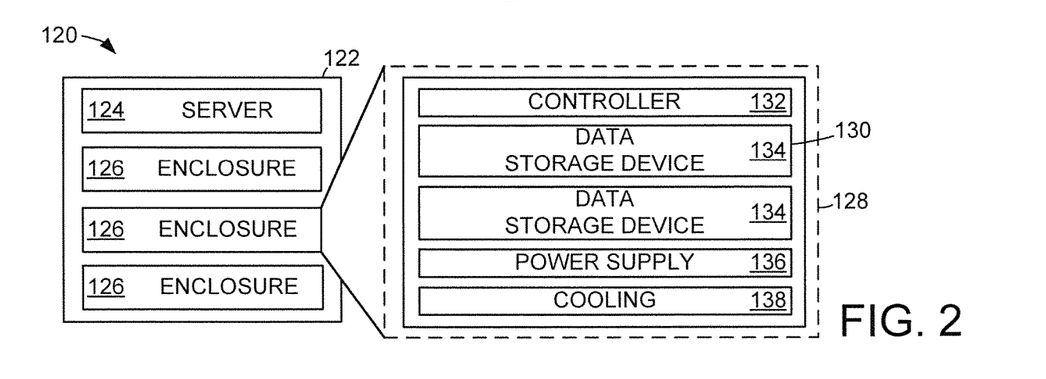
FIG. 2 displays a block representation of a portion of an example data storage system arranged in accordance with various embodiments.

FIG. 2 displays a block representation of a portion of an example data storage rack 120 that can be employed in a single data center. The rack 120 may have a single physical support housing 122 in which at least a local server 124 and one or more data enclosures 126 are physically secured. Although the assorted data enclosures 126 physically positioned in a rack 120 can be configured with dissimilar data storage capabilities, such as data capacity, physical size, data access speed, and processing power, various embodiments arrange each data storage enclosure 126 with similar, albeit not necessarily identical, data storage capabilities provided by the constituent enclosure components shown in segmented box 128.

As a non-limiting example, a data enclosure 126 can have a common housing 130 that supports at least a local data storage controller 132, such as a microprocessor or other programmable circuitry, that directs operation of one or more data storage device 134, such as a hard disk drive or solid state drive, as well as local power 136 and cooling 138 mechanisms. By packaging multiple data storage devices 134 together in a single housing 130, the local controller 132, power 136, and cooling 138 components can provide greater operating efficiencies than if each device 134 was operated independently in different housings and/or in different physical locations.

It is noted that with device-level areal density resolution, errors and failures experienced by a data storage device 134 can jeopardize the performance of the entire data enclosure 126 as the enclosure controller 132 classifies the entire device 134 as failed, reconfigures the areal density of the entire device to compensate for higher error rate, or overloads other enclosure devices 134 to avoid the higher error rate device 134. Conversely, enclosures 126 capable of recording surface-level, or platter-level, areal density resolution can compensate for encountered errors with much less collateral data storage performance effects as a single platter/recording surface can be killed, reconfigured, or redirected, as directed by the local controller 132.

Figure 3A:
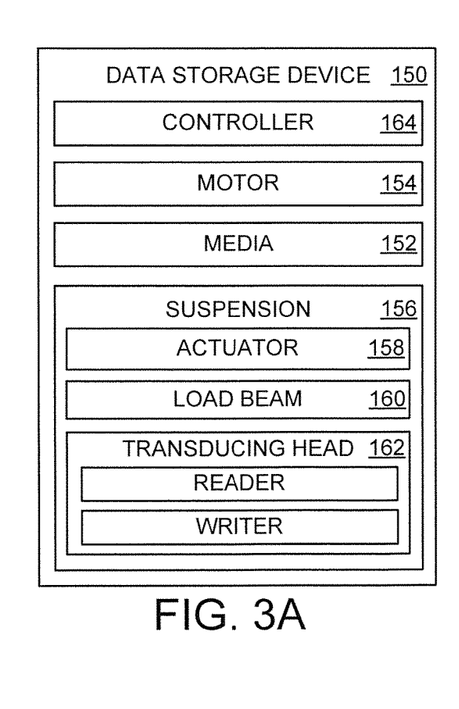
FIGS. 3A-3C represent portions of an example data storage device capable of being used in the systems of FIGS. 1 & 2.
Figure 3B:
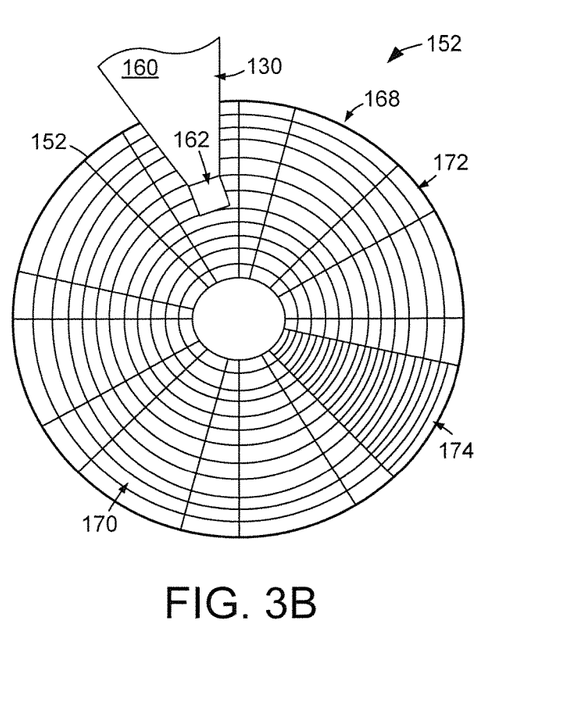
Figure 3C:
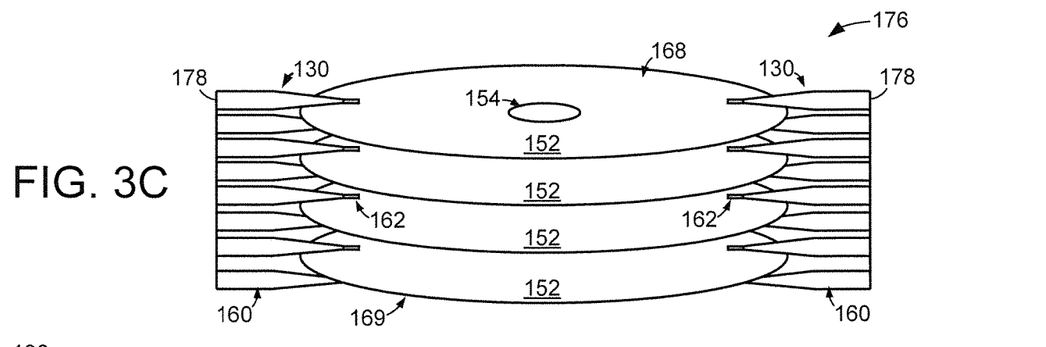

FIGS. 3A-3C respectively depict various portions of an example data storage device 150 that can be utilized in some embodiments of a data storage system as a single storage component or as part of a data enclosure. FIG. 3A is a block representation of a hard disk drive data storage device 150 that employs a plurality of magnetic media 152 rotating about a spindle motor 154 in relation to a transducing suspension 156 to provide data access capabilities.

The transducing suspension 156 can comprise an actuation mechanism 158 that moves a load beam 160 and an attached transducing head 162 over portions of the media 152 designated by a local controller 164. The transducing head 162 can comprise at least one data writer 166 and at least one data reader 168 that can independently, and concurrently, operate to store data to, and retrieve data from, the media 152. It is noted that the transducing suspension 156 may consist of other physical adjustment mechanisms, such as piezoelectric microactuators and/or load beam heaters, that provide fine-grain physical movement parallel and perpendicular to the recording surface of the corresponding media 152.

FIG. 3B illustrates a top view line representation of a single data storage medium 152 that is configured to provide an areal density that corresponds with a data capacity, a data write speed, and a data read speed. As shown, a single recording surface 168, which is the top surface of a single data storage medium, also known as a platter, has a plurality of concentric data tracks 170 that contain magnetic grains corresponding to data bits that are programmable by a transducing head 162. The physical position of a transducing head 162 can be monitored and controlled with one or more servo wedges 172, which may contain gates and/or data that corrects for repeatable runout (RRO) and other operational parameters.

The number of data tracks 170, and constituent data bits, available to receive host-generated data dictates the areal density of the recording surface 168. Such areal density may depend on the data writing/reading resolution of the transducing head 162. That is, a data track 170 may have ample grains to provide a higher number of programmable data bits, but the transducing head 162 can write/read magnetic grains as data bit at a resolution that is lower. Hence, the areal density of the recording surface 168 can be dependent on data bit, data track 170, servo 172, and transducing head 162 configurations.

While data tracks 170 may be physically separate, or abutting, so that there is no overlap between adjacent tracks, some embodiments utilize a shingled data track structure, as shown in region 174, throughout the entire recording surface 168. It is noted that while less than all the recording surface 168 is shown in FIG. 3B as having a shingled track configuration, such arrangement is merely exemplary and if a shingled configuration is chosen, each shingled data track will extend completely around the recording surface 168. A shingled data track structure involves overlapping adjacent data tracks 170 to increase the overall number of data tracks 170 that can be positioned on the recording surface 168. As a result of such shingled data tracks, the areal density of a recording surface will be greater than if non-overlapping, non-shingled data tracks are utilized. It is noted that the transducing head 162 can have different read/write characteristics, such as write plus erase (WPE) distribution, fly height, write speed, and read speed.

The ability to utilize different transducing heads 162 in a data storage device 150 is compounded in a multi-actuation device where multiple different heads 162 concurrently fly over a single recording surface 168. FIG. 3C depicts a perspective view line representation of an example media stack 176 that employs multiple separate data storage media 152 that are collectively rotated by a central spindle motor 154. That is, each media 152 will spin around the motor 154 at the same speed.

Each media 152 has a top recording surface 168 and a bottom recording surface 169 that independently store data via separate transducing heads 162. Although it is contemplated individual head 162 can be articulated to different portions of a recording surface 168 and media 152 independently, various embodiments connect a plurality of heads 162 together in a comb structure 178 that articulates each head 162 to a common location on each separate recording surface 168 of each media 152. The incorporation of a second comb structure 178, as shown, allows a separate group of heads 162 to concurrently move with the other comb 178 to concurrently, or sequentially, access different data, data tracks, and servo, which provides heightened data access speeds.

Through the use of multi-actuation, a data storage device 150 can provide greater data storage capabilities than if a single comb 178 was employed. However, such multi-actuation and increased data access rate can increase the occurrence of physical errors, such as thermal asperities, head-disk contact, and head misalignment from thermal or physical shock. Accordingly, assorted embodiments utilize media-level, or recording surface-level areal density resolution to mitigate the performance degradation associated with physical, and logical, errors that can occur during operation of a single head comb 178 or in dual head comb 178 configurations.

Figure 4:
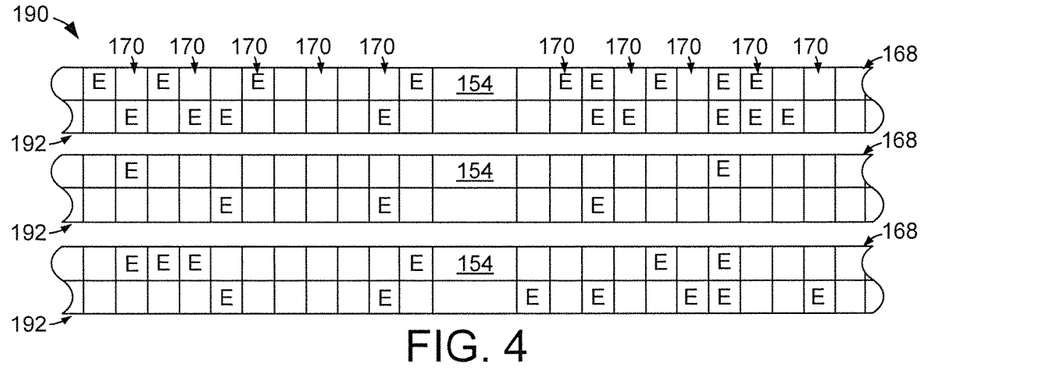
FIG. 4 illustrates portions of an example data storage device employed in accordance with assorted embodiments.

FIG. 4 depicts a cross-sectional line representation of a portion of an example media stack 190 that can be accessed by one or more transducing head combs 178 as part of a single data storage device. Each data storage medium 152 of the stack 190 is shown with a top recording surface 168 and a bottom recording surface 192 that separately store data that are accessed by separate transducing heads 162. It is noted that each recording surface 168/192 is manufactured with a similar areal density configuration, as defined by the data tracks per inch (TPI), bytes per inch (BPI), and servo configuration.

With device-level areal density resolution, physical or logical errors (E) encountered in association with one or more data tracks 170 of a single recording surface can trigger the entire media stack 190, and all constituent recording surfaces 168/192 with less errors, to be characterized as faulty and in need of different scrutiny, or reconfiguration, by a local, or remote, data storage controller. In other words, faults on a single recording surface 168 can result in the entire stack 190 to be treated differently for future data storage operations, which may involve reducing the data access speed, type of data stored, areal density, or operational life of the entire stack 190.

It can be appreciated that the dramatic reaction of reconfiguring each recording surface 168/192 in response to errors on a single surface 168/192 is a direct result of device-level areal density resolution and is costly in terms of data storage capacity, speed, and system performance at least due to the time and processing power required to reconfigure the data, and/or areal density, of the entire media stack 190. In response to these issues and others, recording surface-level resolution allows individual surfaces 168/192, or platters, to be reconfigured without altering surfaces 168/192 with minimal, or no, errors. The configuration from non-overlapping tracks to shingled tracks is very fast, but the reconfiguration from shingled tracks back to non-overlapping tracks is relatively slow and may similar performance to drive formatting operations.

Figure 5:
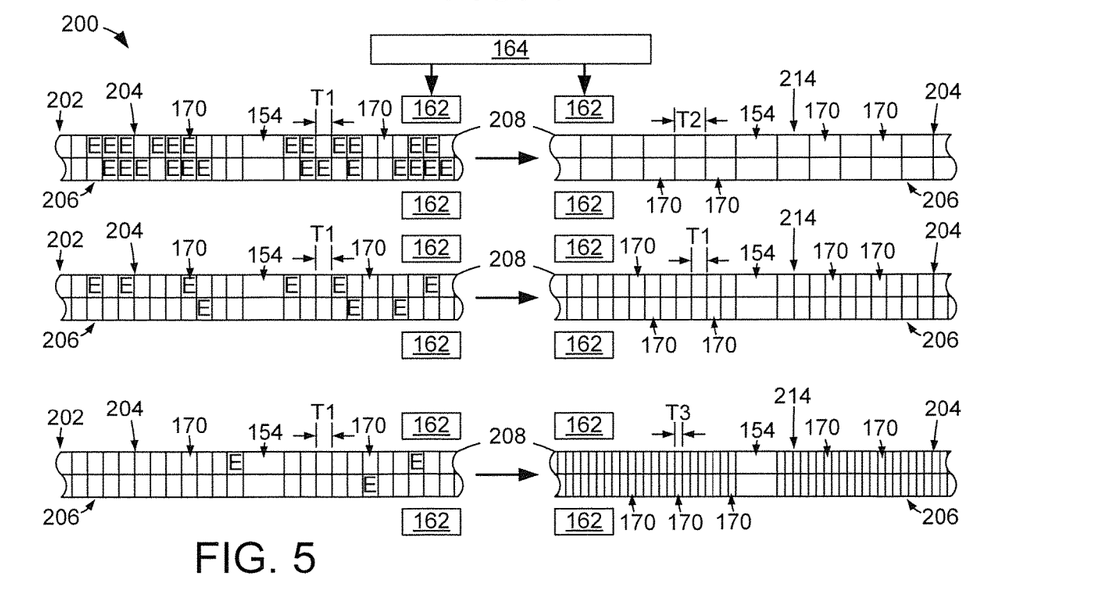
FIG. 5 depicts portions of an example data storage device configured and operated in accordance with some embodiments.

FIG. 5 depicts a cross-sectional line representation of portions of another example media stack 200 that can be employed in a data storage device with recording surface-level areal density resolution in accordance with various embodiments. The media stack 200 has multiple platters 202 that each have a top recording surface 204 and a bottom recording surface 206 each accessed by at least one adjacent transducing head 162 as directed by one or more data storage controllers 164. During normal operation of the media stack 200, physical and/or logical errors (E) are experienced and detected by the controller 164 and the corresponding physical block address (PBA) is marked as faulty.

In the non-limiting example of FIG. 5, a first platter 208 has a first number of errors, a separate second platter 210 of the stack 200 has a second number of errors, and a separate third platter 212 of the stack 200 has a third number of errors. It is noted that the encountered errors may be different, or similar, types of errors, such as read errors, head alignment errors, and physical disparities. The encountered errors may occur at different times, or concurrently, from data access operations, such as data reads and writes to a recording surface 204/206, or from unplanned device movement, such as physical shock, trauma, or vibration.

The data storage controller 164 can respond to the current detected errors, as well as any errors predicted to occur on one or more recording surfaces 204/206, by altering the areal density of one or more recording surfaces 204/206 to mitigate the effects of the errors and optimize the data storage capabilities of the stack 200 despite the presence, or prediction, of data access errors. The alteration of an areal density of a single platter 208, or recording surface 204/206, may occur while other platters 208 are maintained at an original areal density with original TPI, BPI, and servo configurations. In other words, the controller 164 can direct a single recording surface 204/206 to be customized from a first track width (T1) to a greater second width (T2) to eliminate data access delays associated with errors.

The non-limiting example of FIG. 5 illustrates how the system controller 164 can respond to the presence, or prediction, of a number of errors above a predetermined threshold amount by reformatting at least one areal density characteristic, such as TPI, BPI, or servo configuration, of a recording surface 204/206 to a second areal density configuration 214 to provide the maximum data storage performance for the platter 208. Such reformatting may eliminate, correct, or otherwise mitigate the data access degradation attributable to the errors without ignoring errored regions, which consumes valuable system processing and time resources.

As shown with the second platter 210, the system controller 164 can respond to a number of actual and predicted errors that is below a predetermined threshold by maintaining an existing areal density configuration for each recording surface 204/206, as represented by maintaining the track width T1. The existence of a relatively low number of actual and predicted errors, as shown in the third platter 212, can prompt the system controller 164 to increase the areal density configuration, as represented by a reduced track width T3. Such increased areal density for a recording surface 204/206 can compensate for the reduced data capacity of the reconfigured first platter 208. The ability to intelligently change the areal density of an individual platter either up or down allows the system controller 164 to provide nearly seamless compensation of errors to a host without degradation of data access performance or overall capacity.

It is contemplated that different platters 208/210/212 of a stack 200 can be reconfigured for data areal density without physically altering the TPI, BPI, or servo regions. For example, data tracks, or data bits, can be ignored or written as buffers between adjacent data, which decreases the areal density of a recording surface available for user data while increasing data write and read efficiency and accuracy.

In some embodiments, different recording surfaces 204/206 of different platters 208/210/212 are altered relative to each other to maintain efficient comb operation that collectively positions transducing heads to access data. That is, an areal density of a recording surface or platter can be altered, up or down, as a function of one or more other areal densities of a stack 200, which can be characterized as an areal density resolution strategy. For instance, the areal density of platter 208 can be reduced to be half of the areal density of the unaltered second platter 210 while the areal density of the third platter is increased to be double, triple, or 50% more than the second platter 210 or first platter 208.

Such relative platter areal densities allow a head comb, or multiple different combs in the case of a multi-actuation data storage device, to concurrently conduct data access operations on different recording surfaces 204/206. Conversely, non-optimized relative areal densities can result in less than all the heads of a comb being properly aligned with a data track in a manner conducive to accurate data accesses. Accordingly, the altered areal densities of a stack 200 can be arranged so that a majority of heads, 75% of the heads, or every head is aligned with a data track of a recording surface and ready for data access operation.

Figure 6:
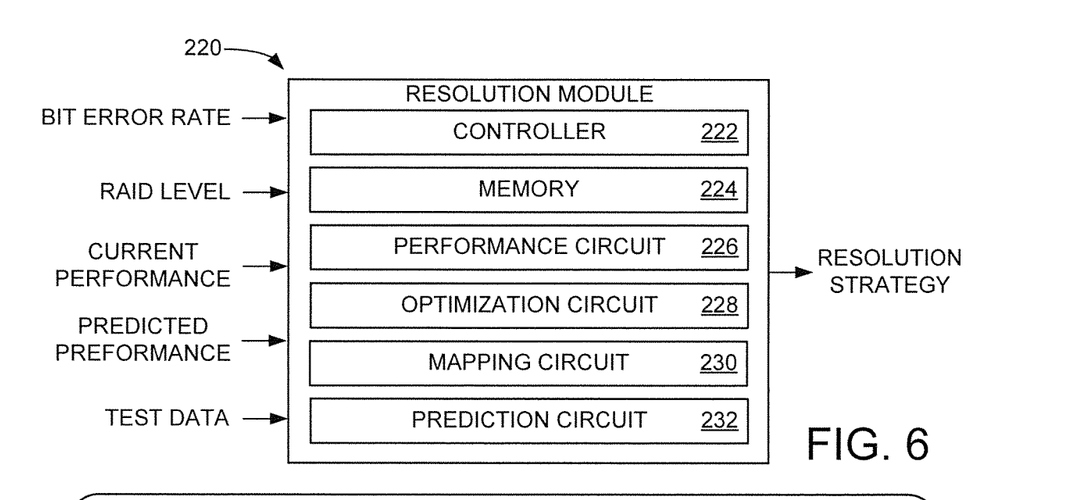
FIG. 6 conveys an example resolution module that may be utilized as part of a data storage system in accordance with various embodiments.

The management of the respective platters 208/210/212 and recording surfaces 204/206 may be directed by a resolution module that utilizes at least one system controller 164. FIG. 6 depicts a block representation of an example resolution module 220 that is designed and operated in accordance with various embodiments to provide intelligent modification of the data storage configuration of a media stack, such as stack 200 of FIG. 5.

The resolution module 220 can be arranged as circuitry resident in one or more locations within a data storage system. For instance, the module 220 can employ one or more programmable controllers 222, a local memory 224, a performance circuit 226, optimization circuit 228, mapping circuit 230, and prediction circuit 232 that respectively may be dedicated to generating a resolution strategy, or shared among several different system components. A resolution strategy can be one or more cause and effect scenarios that are created by the controller 222 to provide automatic response to detected and/or predicted data storage events that optimize data storage for a host, such as a network node or a human user.

A resolution strategy can be stored in the temporary, or permanent, memory 224 in anticipation of a single data storage event or a series of consecutive data storage events. It is noted that a data storage event is not limited to a particular occurrence, but can involve the physical storage of data to at least one physical block address of at least one recording surface of at least one platter of a media stack in a data storage device connected to the resolution module 220. The resolution strategy can be generated and/or altered in response to activity of the performance circuit 226 that monitors data storage activity of the respective recording surfaces of a media stack. The performance circuit 226 may complement operation of the prediction circuit 232 to forecast future data storage activity and any resulting data storage performance metrics.

The performance circuit 226 can track the pendency, execution, and success rate of data reads and data writes to at least one recording surface. Various embodiments document the data storage performance, such as data capacity, error rate, write latency, read latency, TPI, BPI, and age of stored data, for each recording surface and/or platter. Such documentation can take place in response to detected activity and/or with one or more tests generated and executed by the controller 222 without being affiliated with a pending, or actual, data access request from a user. The monitoring and documentation of data storage performance can be tied to a user interface, such as a computer software, application, or graphical dashboard, where the user can identify the recording surface-level data storage capabilities available currently and forecasted to be available by the prediction circuit 232.

The resolution module controller 222 can evaluate any number of hypothetical data storage situations with the optimization circuit 228. By utilizing the data storage performance metrics from the performance circuit 226, the optimization circuit 228 can test various areal density alterations and/or data rearranging actions for practical benefits. The optimization circuit 228 can use one or more stored models and/or algorithms to produce future data storage situations and accurate data storage performance associated with those situations. As a result, the resolution strategy can generate reactive and/or proactive data rearrangements and areal density modifications that will mitigate data storage performance degradation.

The resolution module 220 may also employ the mapping circuit 232 to provide a functioning data storage device after any data rearrangements and/or areal density modifications is carried out as directed by the resolution strategy. The mapping circuit 232 can operate during and after areal density, and/or data rearrangement, to build at least tables and maps that associate logical block addresses with physical block addresses. For example, the mapping circuit 232 can assign physical block addresses to newly reformatted recording surfaces and subsequently fill those addresses with data having a logical block address.

The mapping circuit 232 may reconstruct the progressive versions of data present in a data storage device, such as with metadata and/or forward pointers to the most recent version of data. In some embodiments, the mapping circuit 232 assigns different data tiers, data redundancy, data mirroring, and data parity values across one or more recording surfaces. Hence, the resolution module 220 can exploit recording surface resolution to proactively, and reactively, alter the areal density and/or data arrangement of one or more recording surfaces to optimize data storage.

Figure 7:
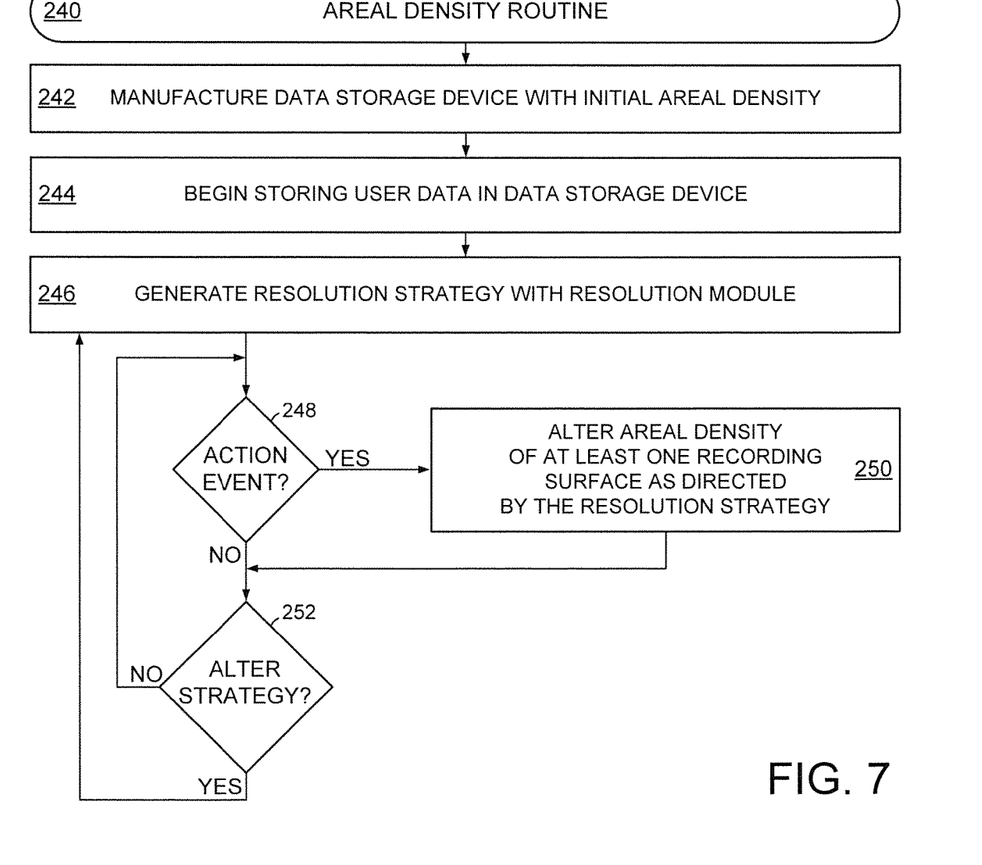
FIG. 7 represents an example areal density routine that can be carried out in accordance with embodiments of a data storage system.

FIG. 7 depicts an example areal density routine 240 that can be carried out with the various embodiments of FIGS. 1-6. A data storage device having a media stack of rotating data storage platters is manufactured in step 242 with an initial areal density. Step 242 may format, test, and verify assorted aspects of the data storage device with the initial areal density before shipping the device for sale to an end-user, such as an individual consumer, employee of a business, or a data storage center. It is contemplated that the initial areal density applies to each recording surface of the media stack, but such configuration is not required as different recording surfaces, or platters, may have dissimilar data capacity, BPI, TPI, and servo configurations within a single media stack.

Once the data storage device is installed into a computing system of an end-user, step 244 can begin storing user-generated data in the various physical block addresses of the data storage device. The storage of user-generated data in the data storage device produces performance metrics, such as error rate, data redundancy, data parity, data access latency, and amount of non-current data, that are monitored and interpreted by a resolution module. With the actual performance metrics from device operation, the resolution module can generate a resolution strategy in step 246 that accurately reflects device capabilities and usage.

Such resolution strategy based on actual measured performance metrics instead of hypothetical or model data ensures the generated resolution strategy more accurately and precisely sets guidelines of when to alter the areal density of one or more recording surfaces in response to an encountered action event. Decision 248 monitors device operation for one or more action events that are prescribed by the resolution strategy. An action event can be any operational occurrence that may, or may not, be related to data storage. For instance, an action event may be time-in-use, device temperature, shock, or physical vibration. An action event may also be a detected data storage condition, such as volume of pending write data, error rate, increased write latency, increased read latency, or change of a recording surface to read-only status.

Regardless of what constitutes an action event as prescribed by the resolution strategy, detection of the event triggers step 250 to alter the data configuration and areal density of at least one recording surface of the device to an altered areal density prescribed by the resolution strategy. As discussed with FIG. 5, an alteration in areal density can modify the tracks, bytes, and/or servo of a recording surface to increase or decrease the data capacity of the recording surface. While not required, it is contemplated that step 250 alters the areal density of a recording surface after moving the existing data to a temporary memory, such as memory 224 of the resolution module. The alteration of a recording surface areal density does not, however, require the entirety of data from non-altered recording surfaces of the media stack to be moved or cached, which increases the efficiency of the conversion from the initial areal density to the altered areal density. The user is responsible for the data management during the alteration. The device itself will not save, or archive, the previously stored data when the areal density is changed.

The conclusion of the modification to the areal density of a recording surface in step 250, or if an action event is not yet encountered, allows routine 240 to proceed to decision 252 where the resolution strategy is evaluated. If a change to the resolution strategy is proper, such as if no areal density alterations have been executed in a certain length of time or if changes to areal density have resulted in worse overall data storage device performance, step 246 is revisited to generate a new resolution strategy based on current detected device performance. If no alteration to the resolution strategy is warranted, decision 252 returns to monitoring device operation for action events in decision 248.

Figure 8:
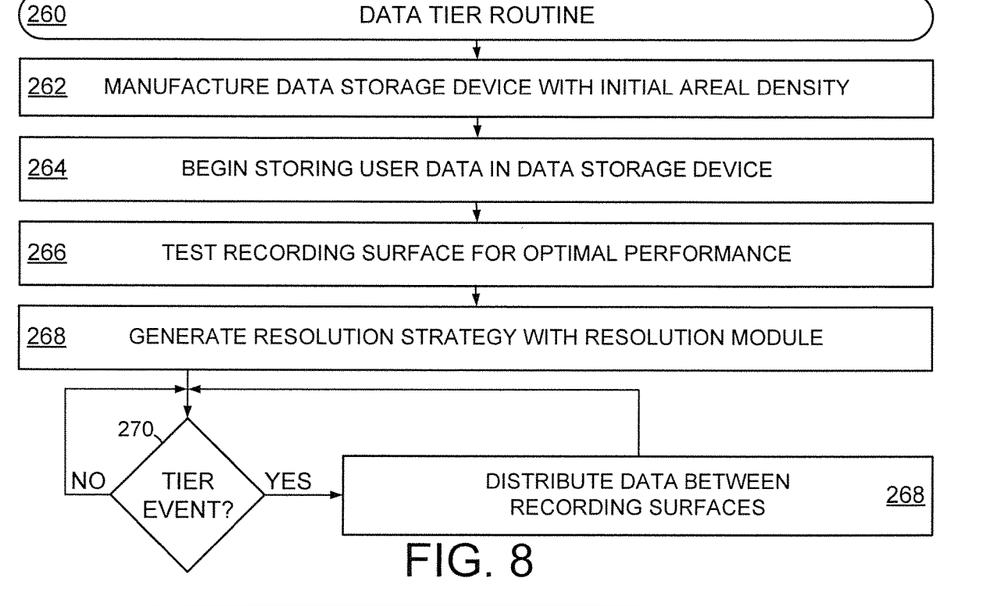
FIG. 8 provides a flowchart of an example data tier routine that may be performed in accordance with assorted embodiments.

While the resolution strategy may allow for optimization of a recording surface by altering areal density, the strategy further can be employed to optimize the organization of data within a media stack without reformatting the initial areal density. The example data tier routine 260 of FIG. 8 depicts how a resolution module can build in data reorganization options into a resolution strategy in accordance with some embodiments. Steps 262 and 264 mirror steps 242 and 244 where a data storage device is manufactured, tested, and shipped to an end-user with an initial areal density where user-generated data is then stored.

It is contemplated that a resolution strategy can be generated simply from the monitored device operation and performance, much like step 246 of FIG. 7. As an alternative, step 266 actively tests at least one recording surface of the data storage device with a predetermined test to determine if optimal data storage is in practice. A test of a recording surface may be called for if user-generated data does not access a recording surface enough to provide sufficient operational and performance data to create a robust resolution strategy. The testing of a recording surface may involve writing test patterns, logging operational runout, and reading various aspects of the recording surface in a manner that conveys how much data access volume and speed the initial areal density can support.

The results of recording surface testing can be utilized with observed data storage operation and performance by the resolution module to then generate a resolution strategy in step 268 that conveys both areal density modifications and data reconfigurations without areal density changes in response to assorted encountered operational situations. Next, decision 270 monitors device operation for an event that calls for data tiering. Such a tier event may involve a bifurcation of stored data into frequently and non-frequently accessed data, high and low security data, or current and non-current data. It is contemplated that a tier event is based on data stored in a device and/or data that is pending in a queue to be written to the device. As such, a tier event can be proactive and occur prior to actual data being stored.

The occurrence of a tier event prompts step 272 to distribute data between recording surfaces as defined by the resolution strategy. The ability to employ recording surface-level resolution, instead of media stack or device-level resolution, allows data tiering to be more precise and catered to smaller chunks of data. For instance, a 500 GB chunk of data can be tiered between different recording surfaces in a 10 TB device with recording surface-level resolution while device-level resolution could merely tier between different devices, which would result in non-optimal data distribution for 9.5 TB.

Figure 9:
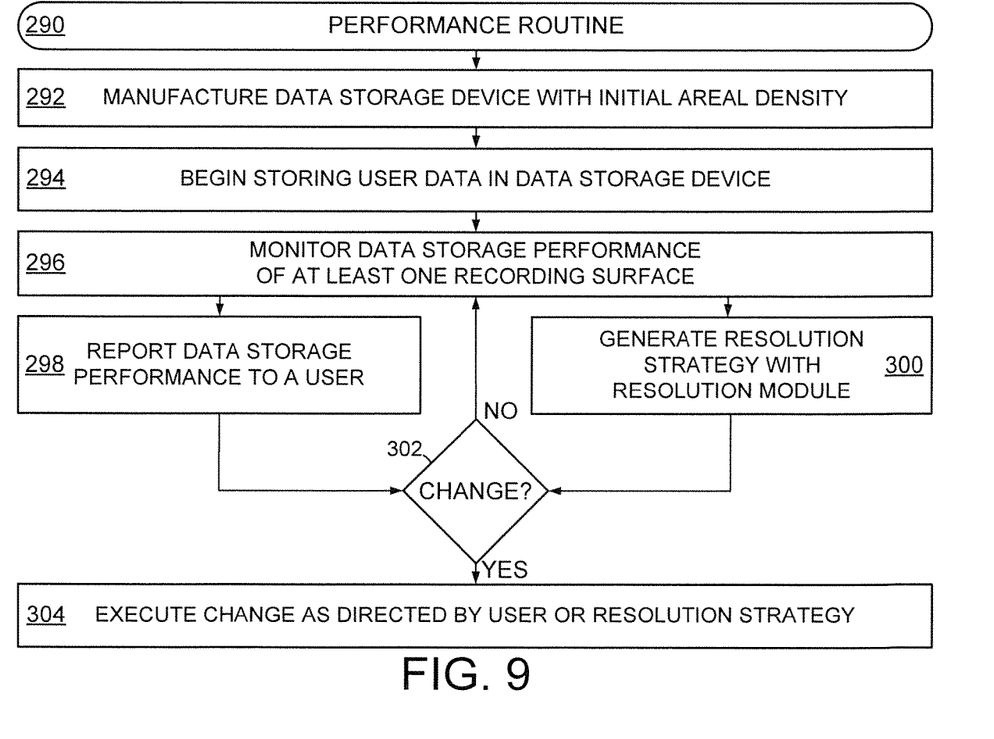
FIG. 9 is an example performance routine executed in accordance with some embodiments by a data storage device.

With recording surface-level resolution and the monitoring of device operation and performance by a resolution module, it is possible to allow host/user control of the quality of data storage for individual recording surfaces. The performance routine 290 of FIG. 9 depicts an example process for allowing a host/user to control data storage in accordance with various embodiments. A data storage device is constructed, tested, and shipped to an end-user in step 292, which allows user-generated data to be stored in the device in step 294.

Over time, data accesses to the device are monitored in step 296 by the resolution module to determine data storage performance of at least one recording surface of the device. The monitored device operation and data storage performance is reported to a user in step 298 via an interface, such as via software, application, or graphical dashboard. Concurrently, step 300 takes the detected device operation and data storage performance and generated a resolution strategy that projects future data storage events and prescribes corrective areal density and/or data rearranging tasks to improve future data storage performance based on how the device is being utilized for data storage.

The means in which data storage information is conveyed to a user may further be employed to provide data storage control. As a non-limiting example, a user interface can allow the user to change the reliability, speed, or organization of data in a device on a recording surface by recording surface manner. Alternatively, the user may select to reduce the areal density of a recording surface to improve data error rate at the sacrifice of data capacity. The user may otherwise select to tier non-frequently accessed data to a recording surface with an increased areal density because the benefit of greater data capacity in a recording surface outweighs the risk of longer data access times and/or greater error rates.

Hence, decision 302 concurrently evaluates if a user has instructed a change to data storage operation and if an event of the resolution strategy has been encountered that prompts a data storage condition change. If so, step 304 executes the change dictated by the user or resolution strategy. If no data storage change is called for, decision 302 returns to step 296 where the resolution module monitors data storage operation and performance, which ensures the resolution strategy is current and directed to providing the optimal data storage conditions based on how the data storage device is actually being used by the user.

It is noted that the various routines 240/260/290 involving the resolution module and a resolution strategy can employ predictive analysis via the prediction circuit. That is, current detected data storage operation and performance can be derived into likely future data storage conditions, such as error rate, data access speed, and volume of non-current data, by the prediction circuit. Thus, the prediction circuit can be utilized by the resolution module to provide a more sophisticated resolution strategy that proactively and reactively corrects data storage situations a recording surface at a time due to the prediction of activity based on actual data storage device operation.

Through the various embodiments of a data storage device, recording surface-level resolution is provided. The additional flexibility and scaling of data storage configuration afforded by recording surface-level, as opposed to device-level, resolution allow precise data storage service that is customized to the data storage device over time. The ability for a user/host to initiate alterations in data storage configuration for a single recording surface further customizes data storage and provides the optimal usage of a data storage device based on the manner in which the data storage device is being used to store user-generated data.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a data storage device comprising a first recording surface and a second recording surface, the data storage device connected to a resolution module, the first recording surface having an altered areal density in response to a resolution strategy generated by the resolution module, the altered areal density being different than an initial areal density of the first recording surface present when the data storage device was manufactured, the second recording surface maintained at the initial areal density by the resolution module after the first recording surface is changed to the altered areal density.

2. The apparatus of claim 1, wherein the second recording surface of the data storage device has the initial areal density when the data storage device was manufactured.

3. The apparatus of claim 1, wherein the first recording surface and the second recording surface are each physically attached to a spindle motor as part of a media stack.

4. The apparatus of claim 1, wherein the resolution module comprises a controller, memory, and optimization circuit configured to generate the resolution strategy.

5. A method comprising:
installing a data storage device into a computing system, the data storage device comprising a first recording surface having an initial areal density;
monitoring data storage operation of the data storage device with a connected resolution module;
generating a resolution strategy with the resolution module based on the monitored data storage operation;
moving data between the first recording surface and a second recording surface in response to a tier event identified in the resolution strategy; and
altering the initial areal density of the first recording surface to an altered areal density prescribed by the resolution strategy.

6. The method of claim 5, wherein the data storage operation involves user-generated data being written to the first recording surface.

7. The method of claim 5, wherein the altered areal density is greater than the initial areal density.

8. The method of claim 5, wherein the altered areal density is less than the initial areal density.

9. The method of claim 5, wherein a second recording surface of the data storage device is positioned on an opposite side of a data storage medium than the first recording surface.

10. The method of claim 5, wherein the tier event involves a bifurcation of stored data into high and low security settings.

11. The method of claim 5, wherein the tier event identifies a volume of frequently accessed data and a volume of non-frequently accessed data stored in the data storage device.

12. The method of claim 5, wherein the tier event increases data reliability and prompts data to be mirrored redundantly in multiple different recording surfaces of the data storage device.

13. The method of claim 5, wherein the altered areal density involves shingled data tracks and the initial areal density involves non-overlapping data tracks.

14. The method of claim 5, wherein the altered areal density has a different number of tracks per inch than the initial areal density.

15. The method of claim 5, wherein the data storage device comprises separate first and second actuators concurrently accessing the first recording surface.

16. A method comprising:
installing a data storage device into a computing system, the data storage device comprising a first recording surface having an initial areal density and a second recording surface having the initial areal density;
monitoring data storage operation of the data storage device with a connected resolution module;
providing a data storage performance to a user via a user interface;
generating a resolution strategy with the resolution module based on the monitored data storage operation;
receiving instructions from a user to change a data storage configuration of the first recording surface; and
altering the initial areal density of the first recording surface to an altered areal density in response to the user's instructions and as prescribed by the resolution strategy while a second recording surface is maintained at the initial areal density after the first recording surface is changed to the altered areal density.

17. The method of claim 16, wherein the user prompts the change of the initial areal density and the resolution strategy dictates the altered areal density configuration.

18. The method of claim 16, wherein the instructions direct an increase in data storage reliability and the altered areal density comprises a lower data capacity and fewer tracks per inch than the initial areal density.

19. The method of claim 16, wherein the instructions direct data to be tiered between different recording surfaces of the data storage device and the resolution strategy distributes data to the first recording surface based on the monitored data storage operation.

20. The method of claim 16, wherein the first recording surface is changed to the altered areal density while every other recording surface of the data storage device remains with the initial areal density.

* * * * *